(12) United States Patent
Araki et al.

(10) Patent No.: US 6,680,124 B1
(45) Date of Patent: Jan. 20, 2004

(54) FLUOROCHEMICAL ADHESIVE MATERIAL AND LAMINATE MADE WITH THE SAME

(75) Inventors: Takayuki Araki, Settsu (JP); Takahiro Kitahara, Settsu (JP); Shigehito Sagisaka, Settsu (JP); Taketo Kato, Settsu (JP); Takeshi Inaba, Settsu (JP); Kazuo Ishiwari, Settsu (JP); Tetsuo Shimizu, Settsu (JP); Hidenori Ozaki, Settsu (JP); Tatsuya Higuchi, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/623,571

(22) PCT Filed: Mar. 5, 1999

(86) PCT No.: PCT/JP99/01095

§ 371 (c)(1),
(2), (4) Date: Nov. 6, 2000

(87) PCT Pub. No.: WO99/45044

PCT Pub. Date: Sep. 10, 1999

(30) Foreign Application Priority Data

Mar. 6, 1998 (JP) .......................................... 10/054915

(51) Int. Cl.[7] .......................... B32B 27/28; B32B 27/32
(52) U.S. Cl. ...................................... 428/421; 428/422
(58) Field of Search ................................ 428/421, 422

(56) References Cited

U.S. PATENT DOCUMENTS

| | | | |
|---|---|---|---|
| 4,916,020 A | 4/1990 | Golding et al. ............. 428/421 |
| 5,415,958 A | * 5/1995 | Takahashi et al. .......... 429/217 |
| 5,736,610 A | 4/1998 | Nishi et al. ................. 525/276 |
| 5,891,538 A | 4/1999 | Yamamoto et al. ........ 428/36.9 |
| 5,965,275 A | 10/1999 | Nishi et al. ............... 428/475.8 |
| 6,107,422 A | * 8/2000 | Wang et al. ................. 526/243 |

FOREIGN PATENT DOCUMENTS

| | | | | |
|---|---|---|---|---|
| EP | 0457255 A2 | 11/1991 | | |
| EP | 0601754 A1 | 6/1994 | | |
| EP | 0650 987 A1 | * 5/1995 | ......... | C08F/259/08 |
| EP | 0816062 A1 | 7/1998 | | |
| GB | 1384398 | 2/1975 | | |
| JP | B1-4929631 | 8/1974 | | |
| JP | 5431492 | 3/1979 | | |
| JP | 5589311 A | 7/1980 | | |
| JP | 5695926 A | 8/1981 | | |
| JP | 63243172 A | * 10/1988 | | |
| JP | 5261856 A | 10/1993 | | |
| JP | 6115000 A | 4/1994 | | |
| JP | 6322028 A | 11/1994 | | |
| JP | 718035 A | 1/1995 | | |
| JP | 725952 A | 1/1995 | | |
| JP | 725954 A | 1/1995 | | |
| JP | 7173447 A | 7/1995 | | |
| JP | 7228848 A | 8/1995 | | |
| JP | 8283338 A | 10/1996 | | |
| JP | 2000326441 A | * 11/2000 | ......... | B32B/15/08 |
| WO | 9629200 A1 | 9/1996 | | |

* cited by examiner

*Primary Examiner*—Sandra M. Nolan
(74) *Attorney, Agent, or Firm*—Birch, Stewart, Kolasch & Birch, LLP

(57) ABSTRACT

A fluorine-containing adhesive material comprising a fluorine-containing ethylenic polymer having a carbonate group and/or a carboxylic halide group at a chain end or a side chain of polymer, wherein a total of a number of the carbonate groups and/or carboxylic halide groups is at least 150 relative to $1 \times 10^6$ main chain carbons, can directly impart the firm adherability to a substrate such as a metal, a glass or a resin while maintaining excellent properties such as resistance to chemicals, resistance to solvent, weatherability and resistance to stain possessed by a fluorine-containing polymer.

18 Claims, 1 Drawing Sheet

Load
Stainless steel
Film  Glass plate  Spacer

Test jig  Test piece

FLUOROCHEMICAL ADHESIVE MATERIAL AND LAMINATE MADE WITH THE SAME

This application is the national phase under 35 U.S.C. §371 of PCT International Application No. PCT/JP99/01095 which has an International filing date of Mar. 5, 1999, which designated the United States of America.

FIELD OF THE INVENTION

The present invention relates to a fluorine-containing adhesive material which can firmly adhere to a substrate comprising an organic material such as a variety of synthetic resins or an inorganic material such as glass and metal. The present invention further relates to a laminate and a shaped article comprising the same as well as a process for producing the shaped article.

RELATED ART

A fluorine-containing polymer has uses since it is excellent in heat-resistance, resistance to chemicals, weatherability, surface properties (a low frictional property and the like), and electrical insulation.

On the other hand, a fluorine-containing polymer is generally insufficient in mechanical strength and dimensional stability, and is expensive.

In order to utilize the advantages of a fluorine-containing polymer to a maximum degree and minimize the defects, this polymer has been extensively studied for its adherence or lamination with other organic materials and the inorganic materials.

However, a fluorine-containing polymer is inherently inert to the adhesion, and it is difficult to adhere a fluorine-containing polymer directly with the other materials (substrate). In many cases, even with heat fusing, the adhesion strength was insufficient and, even if adhered to some extent, the adhesion strength was widely varied depending upon the type of substrate, which reduces the reliance on the adhesionability.

As a method for adhering a fluorine-containing polymer to the other material, the following methods have been used:

(1) a method for physically roughing the surface of a substrate with sandblaster treatment, (2) a method of treating the surface of a fluorine-containing polymer with sodium etching, plasma treatment, photochemical treatment or the like, and (3) a method of adhesion using an adhesive have been mainly studied. However, regarding the above-mentioned (1) and (2), a treating step is necessary and, additionally, the productivity is low due to the complicated step. In addition, the type and shape of a substrate are restricted. Further, the adhesion strength is insufficient and a problem with appearance of the resulting laminate (coloration and flaw) easily arises.

The method and adhesive described in the above-mentioned (3) have drawbacks. Usual adhesives based on hydrocarbon materials have the insufficient adherability, and at the same time, they are insufficient in the heat resistance thereof. So then, they can not withstand the conditions for adhesion-processing a fluorine-containing polymer requiring molding and processing at an elevated temperature, in general, and peeling and coloration due to degradation occur. Since laminates using this adhesive are also insufficient in heat-resistance, resistance to chemicals and resistance to water of an adhesive layer, the adhesion strength can not be retained by a change in temperature and a change in circumstances, making this method less reliable.

The adhesion with an adhesive or an adhesive composition comprising s a fluorine-containing polymer having a functional group has also been studied.

For example, there are a report on the use of, as an adhesive, a fluorine-containing polymers obtained by graft-polymerization of a fluorine-containing polymer with a hydrocarbon monomer having a carboxyl group, a carboxylic anhydride residue, an epoxy group, or a hydrolyzable silyl group, representatives of which are maleic anhydride, vinyl trimethoxysilane and the like (for example, see JP-A-7-18035 (18035/1995), JP-A-7-25952 (25952/1995), JP-A-7-25954 (25954/1995), JP-A-7-173230 (173230/1995), JP-A-7-173446 (173446/1995) and JP-A-7-173447 (173447/1995)). There are also reports in which an adhesive composition comprising a fluorine-containing copolymer obtained by copolymerizing a hydrocarbon monomer containing a functional group, such as hydroxylalkyl vinyl ether and tetrafluoroethylene or chlorotrifluoroethylene, and an isocyanate as a curing agent, are used as an adhesive between vinyl chloride polymer and ETFE (ethylene/tetrafluoroethylene polymer) treated with corona discharge (for example, see JP-A-7-228848 (228848/1995)).

However, the adhesive and adhesive composition comprising a fluorine-containing polymer obtained by graft-polymerizing or copolymerizing a hydrocarbon functional monomer are insufficient in heat-resistance so that degradation and foaming occurs during a processing with a fluorine-containing resin at an elevated temperature or at the use of an elevated temperature, leading to decrease in the adhesion strength, peeling or coloration. In the case of using the above-mentioned adhesive composition described in the JP-A-7-228848 (228848/1995), the fluororesin requires corona discharge treatment.

In addition, it is reported that a fluorine-containing polymer having a functional group obtained by copolymerizing a perfluorovinylether compound containing carboxylic acid or its derivative with a fluorine-containing monomer is used as an adhesive or an adhesive composition. A laminate comprising a fluorine-containing polymer having a functional group introduced by copolymerizing perfluorovinylether having carboxylic group or its derivative with tetrafluoroethylene and the like is described in U.S. Pat. No. 4,916,020.

This is a laminate in which the aforementioned fluorine-containing polymer having carboxylic group or the like is laminated on a metal or the other substrate via an adhesive resin such as an epoxy resin and urethane resin and not a laminate in which the polymer is directly adhered to a metal, glass or other resins. Thus, there is a problem on heat-resistance, resistance to chemicals and resistance to solvent of an epoxy resin or an urethane resin upon use. In addition, although adhesion is possible via an epoxy resin or an urethane resin, a method for adhering directly to a metal, glass or other resins is not explicitly described.

SUMMARY OF THE INVENTION

An object of the present invention is to solve the aforementioned problems of the previous methods and materials and provide a fluorine-containing adhesive material which can directly impart the firm adhesion strength to a substrate, such as metal, glass and a resin, while maintaining excellent properties such as resistance to chemicals, resistance to solvent, weatherability, resistance to stain and unstackiness, which are general characteristics of a fluorine-containing polymer. The present invention also provides a laminate and a shaped article comprising the same. Another object of the present invention is to provide a fluorine-containing adhesive material which can firmly adhere to the above-mentioned substrate by, particularly, heat melting adhesion step, as well as a laminate comprising the same.

The fluorine-containing adhesive material of the present invention comprises a fluorine-containing ethylenic polymer having the number greater than the particular number of carbonate groups and/or carboxylic halide groups at an chain end or a side chain of a polymer. The present inventors discovered that the fluorine-containing adhesive material shows a surprisingly strong adhesion strength relative to a synthetic resin, a metal, a glass, and other materials without surface treatment or coating with an adhesive resin (such as a primer) normally performed in the case of the use of a fluororesin, when the number of carbonate groups and/or carboxylic halide groups of the fluorine-containing ethylenic polymer is greater than the particular number. The present inventors further discovered that a laminate retaining the better adhesion state and a shaped article comprising the same can be obtained by selecting the particular fluorine-containing ethylenic polymer and a counterpart material, and the particular shaping conditions.

The fluorine-containing adhesive material of the present invention has a carbonate group and/or a carboxylic halide group at an end or a side chain of polymer. When the material has the carbonate group, the material comprises a fluorine-containing ethylenic polymer having at least 150 carbonate groups relative to $1 \times 10^6$ main chain carbons. When the material has the carboxylic halide group, the material comprises a fluorine-containing ethylenic polymer having at least 150 carboxylic halide groups relative to $1 \times 10^6$ main chain carbons. When the material has both the carbonate group and the carboxylic halide group, the material comprises a fluorine-containing ethylenic polymer having totally at least 150 those groups relative to $1 \times 10^6$ main chain carbons. In the following explanation, a carbonate group and/or a carboxylic halide group are simply referred to as "carbonyl group-containing functional group" collectively.

The fluorine-containing adhesive material of the present invention comprises a fluorine-containing ethylenic polymer having a carbonyl group-containing functional group at a chain end or a side chain of the polymer and the number of the carbonyl group-containing functional groups is at least 150 relative to $1 \times 10^6$ main chain carbons. When the number is less than 150, the sufficient adhesion strength is not manifested or, even when adhered tightly, peeling easily occurs by deformation, a temperature change, or other environmental change. The number of carbonyl group-containing functional groups in the fluorine-containing ethylenic polymer of the present invention can be appropriately selected from a range of at least 150 depending on a type and shape of a substrate to be adhered, a purpose of adhesion, an application, a required adhesion strength, a form of an adhesive polymer and an adhering method. Preferably, the number of carbonyl group-containing functional groups is at least 250, more preferably at least 300 relative to $1 \times 10^6$ carbons. The upper limit number of carbonyl group-containing functional groups may be 3,000, preferably 2,000, for example 1,000. Too great of a number of carbonyl group-containing functional groups causes deterioration of heat-resistance and chemicals. The carbonate group is selected more preferably from a viewpoint of adhesion strength stability.

The fluorine-containing adhesive material shows the better initial adhesion strength, and the better durability against temperature change (for example, the use at a low temperature or a high temperature) and permeation of water and chemicals.

DETAILED DESCRIPTION OF THE INVENTION

Figure 1:
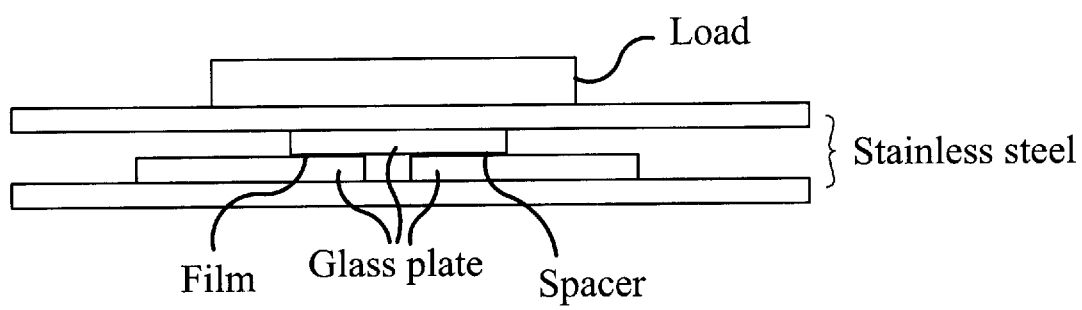
FIG. 1 is a view explaining a process for preparing a test piece which is used for measuring the adhesion strength in the examples.
Figure 2:
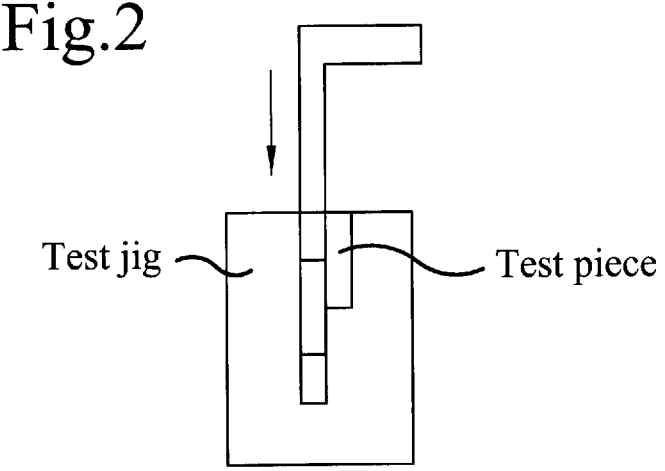
FIG. 2 is a view explaining measurement of the adhesion strength by a tensile shearing method.

The carbonate group in the fluorine-containing adhesive polymer of the present invention is generally a group having a linkage of —OC(=O)O— and, more particularly has the structure of —OC(=O)O—R group, wherein R is a hydrogen is atom, an organic group (for example, $C_1$~$C_{20}$ alkyl group and $C_2$~$C_{20}$ alkyl group having an ether linkage) or I, II and VII group element. Examples of the carbonate group are preferably —OC(=O)OCH$_3$, —OC(=O)OC$_3$H$_7$, —OC(=O)OC$_8$H$_{17}$, and —OC(=O)OCH$_2$CH$_2$OCH$_2$CH$_3$.

The carboxylic halide group in the fluorine-containing adhesive polymer of the present invention has specifically the structure of —COY wherein Y is a halogen element. Examples thereof are —COF and —COCl.

The content of the carbonyl group-containing functional group in the adhesive material of the present invention can be measured by infrared absorption spectrometry. The fluorine-containing adhesive material comprising the fluorine-containing ethylenic polymer having these carbonyl group-containing functional groups itself can maintain the excellent properties such as resistance to chemicals, resistance to solvent, weatherability, resistance to stain and unstackiness which are the general characteristics of the fluorine-containing material, and can impart such excellent characteristics to a laminate after adhesion without lowering the characteristics.

In the fluorine-containing adhesive material of the present invention, the carbonyl group-containing functional group is bonded to the chain end or the side chain of the polymer.

More particularly, the fluorine-containing adhesive material comprises:

(1) a fluorine-containing ethylenic polymer having only a carbonate group at a chain end or a side chain of the polymer, the number of the carbonate groups being at least 150 relative to $1 \times 10^6$ main chain carbons, (2) a fluorine-containing ethylenic polymer having only a carboxylic halide group at chain end or a side chain of the polymer, the number of the carboxylic halide groups being at least 150 relative to $1 \times 10^6$ main chain carbons, or (3) a fluorine-containing ethylenic polymer having both a carbonate group and a carboxylic halide group, the total number of these functional groups being at least 150 relative to $1 \times 10^6$ main chain carbons. Any of the polymers (1) to (3) may be used.

The fluorine-containing adhesive material having carbonyl group-containing functional group at polymer chain end means a material having a carbonyl group-containing functional group at one end or both ends of a polymer chain. On the other hand, the fluorine-containing adhesive material having a carbonyl group-containing functional group on a side chain has the structure of a fluorine-containing ethylenic polymer obtained by copolymerizing an ethylenic monomer having a carbonate group (or a carbonate linkage) and/or a carboxylic halide group with the other fluorine-containing ethylenic monomer. Alternatively, it may have a carbonyl group-containing functional group (or linkage) at both an chain end and a side chain of one polymer.

Among them, the adhesive material having carbonyl group-containing functional group at polymer chain end is preferable because heat-resistance, mechanical property and resistance to chemicals are not remarkably deteriorated and because it is advantageous in terms of the productivity and cost.

In the present invention, the fluorine-containing adhesive material having carbonyl group-containing functional group at polymer chain end may comprise a molecule having a carbonyl group-containing functional group at one end or both ends of one polymer chain or may comprise a mixture of a molecule having a carbonyl group-containing functional group at one end or both ends of a polymer chain and a molecule not containing a carbonyl group-containing functional group.

That is, even when the fluorine-containing polymer not containing carbonyl group-containing functional group exists in the fluorine-containing adhesive material, as long as the adhesive material has at least 150, preferably at least 250, more preferably at least 300 carbonyl group-containing functional groups relative to $1 \times 10^6$ main chain carbons as a whole, the adhesionability with various substrates is not deteriorated.

A type and structure of the fluorine-containing ethylenic polymer (that is, fluorine-containing adhesive polymer) of the present invention are appropriately selected depending upon purpose, application and how to use. Inter alia, it is preferable that the crystal melting point or glass transition point is at most 270° C. In particular, when the lamination is performed by a heat melting adhering process, the ability of the carbonyl group-containing functional group to adhere to the substrate can be fully exerted and the strength for adhering directly to the substrate can be imparted. In addition, preferably, when the crystal melting point or the glass transition point is at most 230° C. and, more preferably at most 200° C., further firm adhesion strength is manifested and lamination with an organic material having the relatively low heat-resistance becomes possible.

The fluorine-containing ethylenic polymer is a homopolymer or a copolymer having a repeating unit derived from at least one fluorine-containing ethylenic monomer.

The fluorine-containing ethylenic monomer is an olefinically unsaturated monomer having at least one fluorine atom, more particularly, tetrafluoroethylene, vinylidene fluoride, chlorotrifluoroethylene, vinyl fluoride, hexafluoropropylene, hexafluoroisobutene, a monomer represented by the formula (ii).

$$CH_2=CX^1(CF_2)_nX^2 \qquad (ii)$$

wherein $X^1$ is H or F, $X^2$ is H, F or Cl, and n is an integer of from 1 to 10, and perfluoro (alkyl vinyl ethers).

In addition, the fluorine-containing ethylenic polymer of the present invention may be a copolymer having the aforementioned fluorine-containing ethylenic monomer unit and an ethylenic monomer unit having no fluorine atom.

The amount ratio of the fluorine-containing ethylenic monomer unit and the ethylenic monomer unit having no fluorine atom may be from 10 to 100 mol % (for example, from 30 to 100 mol %) and from 0 to 90 mol % (for example, from 0 to 70 mol %) respectively.

The ethylenic monomer having no fluorine atom is preferably selected from an ethylenic monomer having at most 5 carbon atoms so as not to deteriorate the heat-resistance and the resistance to chemicals. More particularly, ethylene, propylene, 1-butene, 2-butene, vinyl chloride and vinylidene chloride can be exemplified.

Among them, a fluorine-containing ethylenic polymer involving tetrafluoroethylene unit as an essential component is preferable from a viewpoint of heat-resistance and resistance to chemicals and a fluorine-containing ethylenic polymer involving vinylidene fluoride unit as an essential component is also preferable from a viewpoint of shaping processability.

In the fluorine-containing ethylenic polymer of the present invention, the crystal melting point or the glass transition point of the polymer can be adjusted by selecting a type, combination and composition ratio of the fluorine-containing ethylenic monomer. The polymer may be a resin-type or an elastomer-type. The nature of the fluorine-containing ethylenic polymer may be appropriately selected depending upon purpose and application of adhesion, and purpose and application of a laminate.

Preferable examples of the fluorine-containing ethylenic polymer are:

(I) a copolymer containing tetrafluoroethylene and ethylene units, (II) a polymer containing vinylidene fluoride unit, and (III) a copolymer containing units derived from tetrafluoroethylene and a monomer represented by the formula (i):

$$CF_2=CF-Rf^1 \qquad (i)$$

wherein $Rf^1$ is $CF_3$ or $ORf^2$ ($Rf^2$ is a perfluoroalkyl group having 1 to 5 carbon atoms).

As the copolymer (I) containing tetrafluoroethylene and ethylene units, mentioned is a copolymer having carbonyl group-containing functional group which comprises 30 to 90 mol % (for example, 40 to 80 mol %) of tetrafluoroethylene unit, 10 to 70 mol % (for example, 20 to 60 mol %) of ethylene unit and 0 to 40 mol % of monomer unit copolymerizable therewith relative to whole monomers except for the monomer having carbonyl group-containing functional group (in the case of having carbonyl group-containing functional group at a side chain). Examples of the copolymerizable monomer are hexafluoropropylene, chlorotrifluoroethylene, a monomer represented by the formula (ii):

$$CH_2=CX^1(CF_2)_nX^2 \qquad (ii)$$

wherein $X^1$ is H or F, $X^2$ is H, F or Cl, and n is an integer of from 1 to 10, perfluoro(alkyl vinyl ether), and propylene. Normally, one or at least two of them are copolymerized.

These exemplified fluorine-containing ethylenic polymers having carbonyl group-containing functional group are preferable in that they are excellent in heat-resistance, resistance to chemicals, weatherability, electrical insulating property and untackiness.

Among them, (I-1) a copolymer having carbonyl group-containing functional group which comprises 62 to 80 mol % of tetrafluoroethylene unit, 20 to 38 mol % of ethylene unit and 0 to 10 mol % of the other monomer unit, and (I-2) a copolymer having carbonyl group-containing functional group which comprises 30 to 80 mol % of tetratluoroethylene unit, 10 to 60 mol % of ethylene unit, 10 to 30 mol % of hexafluoropropylene unit and 0 to 10 mol % of the other monomer unit are preferable in that they can maintain the excellent properties of a tetrafluoroethylenelethylene copolymer, a melting point can be relatively low and the adhesionability to the other material can be exerted excellently.

As a preferable example of the polymer (II) containing vinylidene fluoride unit, mentioned is a copolymer having a carbonyl group-containing functional group which comprises 10 to 100 mol % of vinylidene fluoride unit, 0 to 80 mol % of tetrafluoroethylene unit, and 0 to 30 mol % of at least one unit of hexafluoropropylene and chlorotrifluoroethylene relative to whole monomers except for a monomer having a carbonyl group-containing functional group (in the case of having a carbonyl group-containing functional group at a side chain).

More particularly, mentioned are preferably (II-1) polyvinylidene fluoride (PVdF) having a carbonyl group-containing functional group, (II-2) a copolymer having a carbonyl group-containing functional group which comprises 30 to 99 mol % of vinylidene fluoride unit and 1 to 70 mol % of tetrafluoroethylene unit, (II-3) a copolymer having a carbonyl group-containing functional group which comprises 60 to 90 mol % of vinylidene fluoride unit, 0 to 30 mol % of tetrafluoroethylene unit, and 1 to 20 mol % of chrolotrifluoroethylene unit, (II-4) a copolymer having a carbonyl group-contaiaing functional group which comprises 60 to 99 mol % of vinylidene fluoride unit, 0 to 30 mol % of tetrafluoroethylene unit, and 1 to 10 mol % of hexafluoropropylene unit, and (II-5) a copolymer having a carbonyl group-containing functional group which comprises 15 to 60 mol % of vinylidene fluoride unit, 35 to 80 mol % of tetrafluoroethylene unit, and 5 to 30 mol % of hexafluoropropylene unit.

The fluorine-containing polymer (II) having carbonyl group-containing functional group comprising vinylidene fluoride unit is excellent in weatherability, can be shaped and processed at a low temperature and can be dissolved in a solvent and, thus, can be laminated with an organic material having the low heat-resistance.

As the polymer (III), preferable are (III-1) a copolymer having a carbonyl group-containing functional group which comprises 65 to 95 mol %, preferably 75 to 95 mol % of tetrafluoroethylene unit, and 5 to 35 mol %, preferably 5 to 25 mol % of hexafluoropropylene unit, (III-2) a copolymer having a carbonyl group-containing functional group which comprises 70 to 97 mol % of tetrafluoroethylene unit, and 3 to 30 mol % of $CF_2=CFORf^2$ ($Rf^2$ is a perfluoroalkyl group having 1 to 5 carbon atoms), and (III-3) a copolymer having a carbonyl group-containing functional group which comprises tetrafluoroethylene unit, hexafluoropropylene unit, and $CF_2=CFORf^2$ ($Rf^2$ is as defined above) unit, wherein a total of the hexafluoropropylene unit and the $CF_2=CFORf^2$ unit is from 5 to 30 mol %.

These are so-called "perfluorocopolymer" and the most excellent in heat-resistance, resistance to chemicals, water repellency, untackiness and electrical insulating property among fluorine-containing polymers.

The fluorine-containing adhesive material of the present invention can be obtained by copolymerizing an ethylenic monomer having a carbonyl group-containing functional group or linkage with a fluorine-containing ethylenic monomer at the ratio corresponding to a target fluorine-containing polymer. On the other hand, although various methods can be adopted in order to give a fluorine-containing adhesive material having a carbonyl group-containing functional group at a polymer molecule end, a method using a peroxide such as peroxycarbonate as an initiator can be preferably adopted from a viewpoint of economics and the quality such as heat-resistance and resistance to chemicals.

As the peroxycarbonate used for introducing a terminal carbonyl group-containing functional group, preferably used are compounds represented by the following formulas (1) to (4),

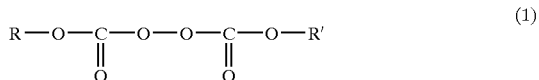

(1)

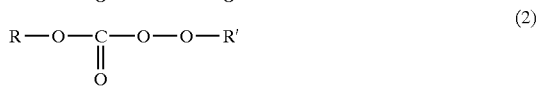

(2)

(3)

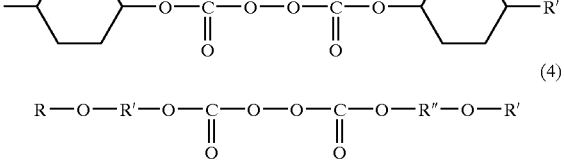

(4)

wherein R and R' represent a linear or branched monovalent saturated hydrocarbon group having 1 to 15 carbon atoms, or linear or branched monovalent saturated hydrocarbon group having 1 to 15 carbon atoms containing alkoxy group at an end, and R" represents linear or branched divalent saturated hydrocarbon group having 1 to 15 carbon atoms, or linear or branched divalent saturated hydrocarbon group having 1 to 15 carbon atoms containing alkoxy group at an end.

Inter alia, diisopropylperoxycarbonate, di-n-propylperoxydicarbonate, t-butylperoxyisopropylcarbonate, bis(4-t-butylcyclohexyl)peroxydicarbonate, and di-2-ethylhexylperoxydicarbonate are preferable.

An amount of the peroxycarbonate to be used is different depending upon a type (composition or the like) and a molecular weight of the polymer of interest, polymerization conditions, and a type of peroxycarbonate to be used and is preferably from 0.05 to 20 parts by weight, particularly from 0.1 to 10 parts by weight relative to 100 parts by weight of the polymer obtained by polymerization.

An average molecular weight of the fluorine-containing ethylenic polymer may be from 3,000 to 10,000,000 (for example, from 30,000 to 1,000,000).

As a method for polymerization, suspension polymerization in an aqueous medium using a fluorine-containing solvent and using the peroxycarbonate as a polymerization initiator is industrially preferable. However, other polymerization methods such as solution polymerization, emulsion polymerization and bulk polymerization can be adopted.

In the suspension polymerization, a fluorine-containing solvent may be used in addition to water. As the fluorine-containing solvent used for suspension polymerization, hydrochlorofluoroalkanes (for example, $CH_3CClF_2$, $CH_3CCl_2F$, $CF_3CF_2CCl_2H$, and $CF_2ClCF_2CFHCl$), chlorofluoroalkanes (for example, $CF_2ClCFClCF_2CF_3$, and $CF_3CFClCFClCF_3$), and perfluoroalkanes (for example, perfluorocyclobutane, $CF_3CF_2CF_2CF_3$, $CF_3CF_2CF_2CF_2CF_3$, $CF_3CF_2CF_2CF_2CF_2CF_3$) can be used. Inter alia, the perfluoroalkanes are preferable. An amount of the fluorine-containing solvent is preferably from 10 to 100% by weight relative to water from a viewpoint of suspension stability and economics.

A polymerization temperature is not particularly limited and may be from 0 to 100° C.

A polymerization pressure is appropriately determined depending upon a type, amount and vapor pressure of a solvent used, and other polymerization conditions such as a polymerization temperature and may be normally from 0 to 100 kgf/cm$^2$G.

Upon preparation of the fluorine-containing ethylenic polymer of the present invention, in order to adjust a molecular weight, the conventional chain transfer agent, for example, a hydrocarbon substance such as isopentane, n-pentane, n-hexane and cyclohexane; an alcohol such as methanol and ethanol; a halogenated hydrocarbon substance such as carbon tetrachloride, chloroform, methylene chloride and methyl chloride can be used.

The content of the carbonate group at end of polymer chain can be controlled by adjusting the polymerization conditions. Inter alia, it can be easily controlled by an amount of peroxycarbonate used as an initiator, an amount of the chain transfer agent to be used and a polymerization temperature.

Although a variety of methods can be adopted in order to give a fluorine-containing adhesive material having a carboxylic halide group at a polymer molecule end, for example, it can be obtained by heating and degrading (decarbonation) a carbonate group of the aforementioned fluorine-containing ethylenic polymer having the carbonate group at chain end.

It is preferable that the heating is carried out so that the polymer itself becomes at least 270° C., preferably at least 280° C., particularly preferably at least 300° C., although it is different depending upon a type of the carbonate group and a type of the fluorine-containing ethylenic polymer. The upper limit of a heating temperature is preferably equal to or below a thermal degrading temperature of a portion other than the carbonate group of the fluorine-containing ethylenic polymer and, more particularly, at most 400° C., particularly preferably at most 350° C.

The fluorine-containing ethylenic polymer of the present invention is preferably used alone for adhesive material so as not to affect adversely the adhesionability, heat-resistance and resistance to chemicals possessed by itself. However, in such a range that its performance is not adversely affected, a variety of fillers such as inorganic powder, glass fiber, carbon fiber, metal oxide and carbon may be incorporated depending upon purpose and application. In addition, a pigment, an ultraviolet-absorbing agent and other arbitrary additive may be incorporated therein besides a filler. A resin such as another fluororesin, a thermoplastic resin and a thermosetting resin, and a synthetic rubber may be incorporated besides the above-mentioned additive and, thereby, the improvement of the mechanical property, the improvement of weatherability, the provision of design property, the prevention of static electricity and the improvement of shapability become possible.

The fluorine-containing adhesive material comprising the fluorine-containing ethylenic polymer can be used as a variety of forms such as a powder, a pellet, a preformed film or sheet, a shaped article, an aqueous dispersion, an organic solvent-soluble material and an organic solvent dispersion.

The better adhesion state is formed between the fluorine-containing adhesive material and the substrate by contacting the substrate with the fluorine-containing adhesive material which has been processed into a variety of these shapes, for example, at heated and pressurized state. The fluorine-containing adhesive material of the present invention can impart the firmer adhesion strength by contacting with the substrate, particularly, in the molten state.

In particular, the material which can be melt-molded among the fluorine-containing adhesive materials of the present invention can be used itself as a material for shaping and can be prepared into a shaped article by the previously known method such as an injection molding, an extrusion, a coextrusion, an inflation molding, a coating, and an insert molding using a mold. Laminates having a variety of shapes such as a film, a sheet, a tube and a hose can be manufactured directly by coextrusion. In addition, a film and a sheet can be manufactured at first and the film and sheet can be laminated with the substrate to prepare a laminate.

A variety of fluorine-containing adhesive polymers of the present invention as described above may also be used for treating the surface of powders or as a paint.

For example, the fluorine-containing adhesive material of the present invention can be formulated into a powder, an aqueous dispersion, an organic solvent dispersion or an organic solvent solution to give a paint composition. The material of the present invention can be used as a primer for a fluorine-containing paint by utilizing the adhesion ability to a variety of substrates possessed by the polymer used for adhesive.

In the present invention, the aforementioned fluorine-containing adhesive material can be shaped into a fluorine-containing adhesive film (hereinafter referred to as "adhesive film").

From a viewpoint of development of a composite material, rationalization and automation of adhesion work, and prevention of pollution, a hot melt adhesive has progressed. However, the use of an applicator is essential for general hot melt adhesives. To the contrary, a film-shaped adhesive dose not need the applicator and can be adhered by placing on a substrate or holding and hot-pressing between substrates, being also advantageous in a viewpoint of rationalization. Since a homogeneous adhesive layer is formed on the whole surface of the substrate, the uniform adhesion strength all over the surface of substrates is obtained and, thus, materials having no or worse compatibility can be dealt with. Further, the film-shaped adhesive can be used by cutting into a variety of shapes and work loss is small and work environment is better, being advantageous from a viewpoint of cost.

The adhesive film of the present invention has the above-mentioned advantages similarly.

The adhesive film can be manufactured by using a variety of fluorine-containing polymers depending upon the application and purpose, the film manufacturing steps, and an adhering method among the aforementioned fluorine-containing adhesive materials. Since the adhesive film itself has excellent heat-resistance, resistance to chemicals, mechanical property and untackiness, can be effectively formed into the film by, for example, a melt molding, has the better mold-processability at a relatively low temperature among fluororesins, can be formed into a thin and homogeneous film and, additionally, can be melt and firmly and smartly adhered to a variety of substrates at a relatively low temperature by a variety of thermal pressing methods, a fluorine-containing adhesive material comprising the above-mentioned copolymer (I), (II) or (III), specifically a fluorine-containing adhesive film obtained by melt molding using the above-mentioned (I-1), (I-2), (II-1), (II-2), (II-3), (II-4), (III-1), (III-2) and/or (III-3) are preferable.

The thickness of the fluorine-containing adhesive film of the present invention is selected depending upon purpose and application and is not particularly limited. The thickness of the fluorine-containing adhesive film may be from 5 to 3,000 μm, preferably from 10 to 500 μm, particularly preferably from 20 to 300 μm.

Too thin films require particular manufacturing methods, and are difficult to be handled upon the adhering procedures, which easily leads to crease, damage and worse appearance. In some cases, they are insufficient in respect of adhesion strength, mechanical strength, resistance to chemicals and weatherability. Too thick films are disadvantageous in respect of cost and workability upon incorporation by bonding.

Further, the present invention can provide a fluorine-containing adhesive laminate film (hereinafter referred to as "adhesive laminate film") prepared by laminating:

(A-1) a layer comprising the above-mentioned fluorine-containing adhesive material, and (D-1) a layer comprising a fluorine-containing ethylenic polymer having no carbonyl group-containing functional group or, if any, having less than 150 carbonyl group-containing functional groups relative to $10^6$ main chain carbons.

That is, one surface has the adhesionability to the substrate derived from a layer comprising a fluorine-containing ethylenic polymer having the number greater than the specified number of carbonyl group-containing functional groups, and the other surface is a layer comprising a conventional fluorine-containing polymer. The excellent properties such as resistance to chemicals, weatherability, resistance to stain, unstickiness, low friction and electrical property can be imparted to the substrate or the laminate comprising the substrate by contacting a fluorine-containing adhesive surface with the substrate and adhering them by procedures such as thermal pressing.

In the adhesive laminate film of the present invention obtained by laminating layers (A-1) and (D-1), the fluorine-containing ethylenic polymer (D-1) can be specifically selected from polytetrafluoroethylene (PTFE), a tetrafluoroethylene/perfluoro(alkyl vinyl ether) copolymer (PFA), a tetrafluoroethylene/hexafluoropropylene copolymer (FEP), an ethylene/tetrafluoroethylene copolymer (ETEE), an ethylene/chlorotrifluoroethylene (ECTFE), polyvinylidene fluoride (PVdF), and a vinylidene fluoride copolymer. In order to maintain and utilize the better shaping and adhesion processabilities of the adhesive laminate film of the present invention at the time of laminating the layers (A-1) and (D-1) or upon adhesion to the other material, it is preferable to select the layer (D-1) from fluorine-containing polymers having a crystal melting point or a glass transition point of at most 270° C. Thereby, the excellent properties of the aforementioned fluorine-containing polymers can be preferably imparted to the substrate or the laminate comprising the substrate.

Although according to the adhesive laminate film comprising two layers of the present invention a combination of two layers can be variously selected depending upon purpose, application and a processing method, it is preferable that the adhesionability and compatibility between them are well.

Specifically, the material comprising the layer (A-1) having the adhesionability among two layers is preferably selected from polymers so that a carbonyl group-containing functional group imparting the adhesionability is introduced to the polymer having the similar monomer composition as in the layer (D-1) comprising the fluorine-containing polymer.

More particularly, i) a fluorine-containing laminate film obtained by laminating:

(A-1) a layer comprising an adhesive material including the above-mentioned copolymer (I), and (D-1) a layer comprising a copolymer comprising tetrafluoroethylene unit and ethylene unit is preferable in that it imparts the excellent heat-resistance, resistance to chemicals and mechanical properties and is excellent in melt molding processability, and ii) a fluorine-containing laminate film obtained by laminating:

(A-1) a layer comprising an adhesive material including the above-mentioned polymer (II), and (D-1) a layer comprising at least one polymer selected from the group consisting of PVdF and vinylidene fluotide copolymer is preferable in that it is excellent in weatherability and shaping processability, iii) a fluorine-containing laminate film obtained by laminating:

(A-1) a layer comprising an adhesive material including the above-mentioned polymer (III), and (D-1) a layer comprising a polymer comprising 75 to 100 mol % of tetrafluoroethylene unit and 0 to 25 mol % of monomer unit represented by the formula (i):

$$CF_2=CFRf^2 \qquad (i)$$

wherein $Rf^1$ is $CF_3$ or $ORf^2$ ($Rf^2$ is perfluoroalkyl group having 1 to 5 carbon atoms) is preferable in that it is particularly excellent in heat-resistance, resistance to chemicals, untackiness and water repellency.

The thickness of the adhesive laminate film of the present invention having two layers is selected depending upon purpose and application and is not particularly limited. The total thickness of two layers is from 10 to 5,000 $\mu$m, preferably from 20 to 1,000 $\mu$m, particularly preferably from 50 to 500 $\mu$m.

Regarding the thickness of each layer, the adhesive layer (A-1) may be from 5 to 1,000 $\mu$m and the fluorine-containing polymer layer (D-1) may be from 5 to 4,995 $\mu$m. Preferably, the thickness of the adhesive layer (A-1) is from 10 to 500 $\mu$m and the thickness of the fluorine-containing polymer layer (D-1) is from 10 to 990 $\mu$m and, particularly preferably, the layer (A-1) is from 10 to 200 $\mu$m and the layer (D-1) is from 40 to 490 $\mu$m.

In the present invention, a suitable reinforcing agent, a filler, a stabilizer, an ultraviolet absorbing agent, a pigment and other additives may be appropriately contained in the adhesive film and at least one layer of the adhesive laminate film in such a range that does not deteriorate the properties. By the addition of such additives, it is also possible to improve heat stability, surface hardness, resistance to abrasion, weatherability, electrification and others.

The adhesive film of the present invention can be prepared by a thermal melting method, an extrusion method, a cutting method, a solvent casting method, and a method of coating a powder, or an aqueous or organic solvent dispersion to form a continuous film and the like, depending upon a polymer used and a shape of a film of interest.

For example, a functional group-containing fluorine-containing polymer of the spresent invention is an adhesive having the better melt mold processability at a relatively low temperature and, for this reason, the compression molding and the extrusion can be adopted. In particular, the melt extrusion is a preferable method for the reasons of productivity and quality.

For preparing an adhesive laminate film of the present invention comprising two layers (A-1) and (D-1) by bonding and unifying, a method of piling each of the shaped laminate films (A-1) and (D-1) and compression molding them, a method of coating anyone on the other shaped film, and a method of bonding and unifying simultaneously with the film shaping by a multilayer coextrusion method may be adopted. Inter alia, a multilayer coextrusion method is preferable in terms of productivity and quality.

Adhesion of the adhesive film of the present invention and the adhesive laminate film with the substrate is accomplished by thermal activation by heating or the like. The heat melting adhesion is preferable. In particular, the fluorine-containing adhesive of the present invention manifests the firm adhesion strength with a substrate upon heat melting adhesion. Representative adhering methods are a thermal roll method, a thermal pressing method, a coextrusion method in the case where the substrate is a thermoplastic resin, and other methods such as a high frequency heating method, a microwave method, a vacuum contact bonding method (such as vacuum pressing), and an air pressure method. The adhering method can be appropriately selected depending upon a type and shape of a counterpart substrate and a state and a type of a film.

The adhesive film and the adhesive laminate film of the present invention are constructed by a variety of shapes, sizes and thickness as described above and can be used for a wide range of application due to the excellent adhesionability to a variety of substrates and the excellent properties possessed by the fluorine-containing polymer. They may be used, for example, as a tube-shaped, plate-shaped, bent plate-shaped, crooked plate-shaped film for protecting a exterior or interior decorated metal tube and bar. Examples of the application are a corrosion-proof tape for wrapping chemical plant pipings, a corrosion-proof tape for wrapping the bottom of chemical plant can, a tape for corrosion prevention of pipings such as shipdeck, a corrosion-proof tape for the other pipings, the application for imparting weatherability to, for example, a signboard, an agricultural and other greenhouse roof or side wall, an exterior decorated material, the surface of a solar cell, and an interior decorated material requiring excellent resistance to stain. Further, they can be also used for the utilities requiring resistance to chemicals such as food wrapping and drug wrapping.

In addition, they can be used for the utilities requiring untackiness and low friction property such as a fixation roll and a press roll for a copying machine and a printer, a food processing apparatus, and a cooking machine, utilities requiring the electrical properties such as a printed board, utilities requiring the water repellency such as a water repellent glass, and liquid crystal related material utilities such as a liquid crystal display, and motorcar related material utilities.

Further, the present invention relates to a laminate comprising the aforementioned fluorine-containing adhesive material and a substrate adhered thereto.

The fluorine-containing ethylenic polymer (A) having a carbonyl group-containing functional group of the present invention has the better property for directly adhering to the substrate such as a variety of inorganic materials and organic materials without any treatment on the surface of the substrate and can form a variety of laminates.

A first embodiment of the laminate of the present invention (hereinafter referred to as "laminate 1") is a laminate comprising:

(A-2) a layer comprising the aforementioned fluorine-containing adhesive material, (B-1) an organic material having a site exhibiting the affinity or the reactivity with the layer (A-2), particularly a carbonyl group-containing functional group.

The thickness of the laminate 1 may be from 15 to 10,000 μm, preferably from 25 to 4,000 μm. The thickness of the fluorine-containing adhesive material layer (A-2) may be from 5 to 2,000 μm, preferably from 10 to 1000 μm. The thickness ef the organic material layer (B-1) may be from 10 to 9,000 μm, preferably from 15 to 3,000 μm.

That is, the fluorine-containing adhesive material (A-2) of the present invention can impart better adhesion strength not only to a fluorine-containing polymer but also other organic materials due to effect of a carbonyl group-containing functional group contained therein. Inter alia, an organic material having a functional group having the reactivity or the affinity with a carbonyl group-containing functional group in the layer (A-2) is preferable in the adhesion strength with the layer (A-2).

The organic material in the laminate 1 of the present invention is a synthetic polymer material such as a synthetic resin, a synthetic rubber, a synthetic fiber and a synthetic leather, a natural organic material such as a natural rubber, a natural fiber, a timber, a paper and a leather, or a composite of them.

Inter alia, a fluorine-free polymer material compensates the mutual defects by laminating the fluorine-containing polymer, so that such laminate can be used for a variety of applications.

Examples of the fluorine-free polymer are polyester, polyamide, polyphenylene sulfide, polyacrylaie, polyvinyl acetate, polyolefin, polyvinyl chloride, polycarbonate, polystyrene, polyurethane, acrylonitrile/butadiene/styrene copolymer (ABS), polyimide, polyamideimide, polyetheretherketone (PEEK), polyether sulfone (PES), polysulfone, polyphenylene oxide (PPO), polyaramide, polyacetal, polyetherimide, a silicone resin, an epoxy resin, a phenol resin, an amino resin, an unsaturated polyester, and cellulose materials.

Inter alia, (1) polymer materials having a functional group or a polar group having the reactivity or the affinity with a carbonyl group-containing functional group in a molecule are preferable in the property for adhering to fluorine-containing adhesive material of the present invention. More particularly, those having functional groups such as a hydroxyl group, a carboxyl group, a carboxylic salts, an ester group, a carbonate group, an amino group, an amido group, an imido group, a mercapto group, a thiolate group, a sulfonic acid group, sulfonic salts and an epoxy group are preferable. (2) Polymer materials having the high heat-resistance are preferable among resins other than the fluorine-containing polymer in that they withstand a high shaping temperature required for the shaping of a fluororesin and maintain heat-resistance as a whole laminate, and such laminate can impart both excellent properties of a fluorine-containing polymer and characteristics of fluorine-free polymer materials. (3) A thermoplastic resin is preferable in that adhesion with the fluorine-containing adhesive material of the present invention and shaping can be carried out at the same time and the melt shaping can be carried out with the multilayer shaping. Inter alia, a thermoplastic resin having a crystal melting point of at most 270° C., particularly at most 230° C. is preferable in that it manifests the particularly excellent adhesionability upon melt adhering processing.

More particularly, polyamide, polyester, polyphenylene sulfide, polycarbonate, polyamideimide, PEEK, PES, polysulfone, PPO, polyetherimide, polyacetal, polyvinyl alcohol, an ethylene/vinyl alcohol copolymer, and an epoxy-modified polyethylene are preferable. Inter alia, polyamide, polyester and polycarbonate are preferable examples in that they have the better melt shaping property, polymers themselves are excellent in mechanical properties, they can impart excellent resistance to chemicals, resistance to solvent, solvent impermeability, weatherability, resistance to stain and optical properties (low refractive index) by laminating with a fluororesin.

Inter alia, polyamide is preferable and examples of the polyamide are (1) a polyamide resin, (2) a polyamide elastomer (3) a polyamide resin alloy.

Examples thereof are as follows:
(1) Polyamide resins which are synthesized by ring opening polymerization of cyclic aliphatic lactam; condensation of aliphatic diamine and aliphatic dicarboxylic acid or aromatic dicarboxylic acid; condensation polymerization of amino acid; copolymerization with a dimer acid containing, as a main component, a dicarboxylic acid having 36 carbon atoms, obtained by dimerization of unsaturated fatty acid, and with a short chain dibasic acid.

For example, nylon 6, nylon 6,6, nylon 10, nylon 6,12, nylon 4,6, nylon 3,4, nylon 6,9, nylon 12, nylon 11, nylon 4, copolymerized polyamides such as nylon 6/6,10, nylon 6/6,12, nylon 6/4,6, nylon 6/12, nylon 6/6,6, nylon 6/6,6/6, 10, nylon 6/4,6/6,6, nylon 6/6,6/6,12, nylon 6/4,6/6,10, and nylon 6/4,6/12.

An average molecular weight of the polyamide resin is normally from 5,000 to 500,000. Among these polyamide resins, polyamides 11, 12, and 6,10 are preferably used for the laminate tube of the present invention.

(2) Polyamide elastomer which contains AB type block type polyether ester amide having a polyamide component as a crystalline hard segment and polyether component as a soft segment and a polyether amide elastomer. This can be obtained, for example, by condensation reaction of lauryl lactam with dicarboxylic acid and tetramethylene glycol.

A carbon number of a hard segment part and a carbon number of a soft segment part and a ratio of hard to soft segments, as well as a molecular weight of each block can be arbitrarily designed from a viewpoint of flexibility and elastic recovery.

(3) Polyamide alloy
(3.1) Polyamide/Polyolefin-based Alloy
For example, Zaitel ST manufactured by Dupont, Leona 4300 manufactured by Asahi Chemical Industry Co., Ltd., Nopamid ST220 manufactured by Mitsubishi Chemical Corp., and Nylon EX1020 manufactured by Unitika Ltd.
(3.2) Polyamide/Polypropylene-based Alloy
For example, Systemer S manufactured by Showa Denko Ltd.
(3.3) Polyamide/ABS-based Alloy
For example, Toyorack SX manufactured by Toray Ltd.
(3.4) Polyamide/Polyphenylene Ether-based Alloy
For example, Nolyl GTX600 manufactured by Japan GE Plastics K. K., and Lemalloy B40 manufactured by Mitsubishi Chemical Corp.
(3.5) Polyamide/Polyarylate-based Alloy
For example, X9 manufactured by Unitika Ltd.

A laminate 1 comprising the fluorine-containing adhesive material (A-2) of the present invention and the organic material (B-1) can be laminated with (D) a layer comprising a fluorine-containing polymer having no carbonyl group-containing functional group or, if any, having less than 150 carbonyl group-containing functional groups relative to $10^6$ main chain carbons on the adhesive material (A-2) side.

In this case, a fluorine-containing adhesive material used as an adhesive layer for a laminate comprising these 3 layers is preferably a material whose composition is similar to that of the fluorine-containing polymer and which has a carbonyl group-containing functional group from a viewpoint of mutual adhesionability. The thickness of the three-layered laminate may be from 25 to 10,000 $\mu$m, preferably from 40 to 4,000 $\mu$m. The thickness of the fluorine-containing adhesive material layer (A-2) may be from 5 to 2,000 $\mu$m, preferably from 10 to 1,000 $\mu$m. The thickness of the layer (D) comprising the fluorine-containing polymer having no carbonyl group-containing functional group or, if any, having less than 150 carbonyl group-containing functional groups relative to $10^6$ main chain carbons is from 10 to 5,000 $\mu$m, preferably from 15 to 3,000 $\mu$m. The thickness of the organic material (B-1) is from 10 to 5,000 $\mu$m, preferably from 15 to 3,000 $\mu$m.

That is, it is a laminate comprising:
(A-3) a layer comprising the aforementioned fluorine-containing adhesive material,
(D-2) a layer comprising a fluorine-containing polymer having no carbonyl group-containing functional group or, if any, less than 150 carbonyl group-containing functional groups relative to $10^6$ main chain carbons, and
(B-2) a layer comprising the aforementioned organic material,
wherein the layer (A-3) is positioned between the layers (D-2) and (B-2) to give an adhesive layer, and can effectively impart the excellent properties of the fluorine-containing polymer to the organic material.

In this case, the fluorine-containing adhesive material (A-3) used in an adhesive layer of a laminate 1 comprising these 3 layers is preferably a material whose composition is similar to that of the fluorine-containing polymer (D-2) and which has a carbonyl group-containing functional group in a viewpoint of mutual adhesionability.

In the laminate comprising the fluorine-containing adhesive material (A-2) of the present invention, the fluorine-containing polymer (D-2) and the organic material (B-2), a suitable reinforcing agent, a filler, a stabilizer, an ultraviolet absorbing agent, a pigment and other additives can be contained in each layer in such a range that dose not deteriorate the adhesionability and the other properties of a fluorine-containing polymer. Such additives can improve heat stability, surface hardness, resistance to abrasion, weatherability, electrification and others.

By the way, polyamides are excellent in high strength, high toughness and processability and are widely used for a hose, tube and pipe. On the other hand, although they are excellent also in resistance to oil, their resistance to an alcoholic solvent is less. In particular, when a gasoline containing a lower alcohol is used, the resistance to oil (resistance to gasohol) is deteriorated vigorously to cause volumetric expansion, fuel penetration and even deterioration of mechanical strength of the material.

Therefore, the polyamide and the fluorine-containing polymer are laminated and, thereby, improvement of resistance to gasohol and utilization of a tube for fuel piping are sought and a variety of studies have been hitherto conducted. For example, for obtaining a laminate tube of a polyamide and ETFE by coextrusion and the like, a composition comprising a polyamide and ETFE was used as an adhesive layer (WO95/11940 pamphlet, WO96/29200 pamphlet). However, these adhesive layer materials are a composition of polyamide and ETFE and they themselves are insufficient in heat-resistance, resistance to chemicals and resistance to solvent. In addition, adhesion between a polyamide and an adhesive layer is not caused via a reaction but by only anchor effect, so that the adhesion strength is easily affected by the morphology of an adhesive layer composition. As a result, the adhesion strength easily changes at a great extent by even small change of extrusion conditions and a temperature used.

The fluorine-containing adhesive material of the present invention firmly adheres to also a polyamide and, thus, can provide a laminate by which the aforementioned problems have been overcome.

Therefore, a laminate tube obtained by shaping the laminate comprising a layer comprising a polyamide and a layer comprising the fluorine-containing adhesive material of the present invention into a tubular shape can be effectively utilized as a tube for fuel piping and liquid chemicals.

Preferable embodiments of the laminate tube comprising the polyamide are:

i) a laminate tube in which a laminate comprising:
   (A-4) a layer comprising a fluorine-containing adhesive material comprising the aforementioned polymer (I), and
   (B-3) a layer comprising polyamide is formed into a tube, wherein the layer (A-4) is an internal layer;

ii) a laminate tube in which a laminate comprising:
   (A-4) a layer comprising a fluorine-containing adhesive material comprising the aforementioned copolymer (I),
   (D-3) a layer comprising ETFE, and
   (B-3) a layer comprising a polyamide is formed into a tube, wherein the ETFE (D-3) is an innermost layer;

iii) a laminate tube in which a laminate comprising:
   (A-4) a layer comprising a fluorine-containing adhesive material comprising the aforementioned copolymer (II), and
   (B-3) a layer comprising a polyamide is formed into a tube, wherein the layer (A-4) is an internal layer;

iv) a laminate tube in which a laminate comprising:
   (A-4) a layer comprising a fluorine-containing adhesive material comprising the aforementioned copolymer (II),
   (D-3) a layer comprising PVdF or VdF-based copolymer, and
   (B-3) a layer comprising a polyamide is formed into a tube, wherein the PVDF or VdF copolymer (D-3) is an innermost layer;

v) a laminate tube in which a laminate comprising:
   (B-3) a layer comprising a polyamide
   (A-4) a layer comprising a fluorine-containing adhesive material comprising the aforementioned copolymer (I) or (II), and
   (B-3) a layer comprising a polyamide is formed into a tube, wherein the layer (A-4) is positioned in an intermediate layer between two polyamide layers (B-3).

The similar filler, reinforcing agent and additive to those described above can be added to each layer of these laminates in such a range that does not deteriorate their objective properties. When used in fuel piping or liquid chemicals, it is preferable that a filler which imparts the electrical conductivity is added to layers ((A-4) and (D-3)) of a fluorine-containing polymer as an internal layer.

A laminate tube of the present invention can be of any required shape by a variety of post-processing. For example, a necessary part such as a connector is attached to the laminate, and the laminate can be processed into L-shape or U-shape by a bend process, or can be formed into a cellular corrugate tube shape.

Further, a preferable embodiment of a laminate comprising the fluorine-containing adhesive material of the present invention is a laminate comprising:

(A-5) a layer comprising the aforementioned fluorine-containing adhesive material (A), and
(B-4) a layer comprising an ethylene polymer.

It is preferable that the ethylene polymer layer (B-4) has a functional group having the reactivity or the affinity with the aforementioned carbonate group or carboxylic halide group. More particularly, preferable examples are epoxy-modified polyethylene, an ethylene/vinyl acetate copolymer, an ethylene/vinyl alcohol copolymer, an ethylene/maleic anhydride copolymer and an ethylene/acrylic acid copolymer. These laminates can be shaped into various shapes as described above. Inter alia, when shaped into a tank shape, it can be utilized as a gasoline tank for automobiles, for which the application of a resin has been progressed recently, and fuel permeability can be improved and heat-resistance can be imparted. More particularly, examples are preferably:

i) a laminate comprising
   (A-5) a fluorine-containing adhesive material comprising the aforementioned polymer (I) or (III), and
   (B-4) an ethylene polymer, which is formed into a tank, wherein the adhesive material (A-5) is positioned on an internal layer side; and ii) a laminate comprising:
   (B-4) an ethylene polymer,
   (A-5) a fluorine-containing adhesive material comprising the aforementioned polymer (I) or (II) or (III), and
   (B-4) an ethylene polymer, which is shaped into a tank, wherein the layer (A-5) is positioned between two layers (B-4).

Further, when a laminate comprising the fluorine-containing adhesive material of the present invention and the ethylene polymer is shaped into bottle shape, it can be used as a bottle in the field of semiconductors due to excellent resistance to chemicals of a fluorine-containing polymer.

More particularly, preferable is i) a laminate comprising:
   (A-5) a fluorine-containing adhesive material comprising the aforementioned polymer (I) or (III), and
   (B-4) an ethylene polymer, which has been shaped into a bottle, wherein the adhesive material (A-5) is positioned on an internal layer side. In particular, a laminate in which the aforementioned polymer (III) is positioned in an internal layer is preferable.

A process for preparing the laminate 1 of the present invention is appropriately selected depending upon a type and form of a fluorine-containing adhesive material and a type and shape of an organic material.

For example, adopted are a method of preparing a fluorine-containing adhesive film using a fluorine-containing adhesive material, wrapping with an organic material and laminating by thermal activation by heating as described above; a method of preparing a fluorine-containing adhesive material paint such as an aqueous or organic solvent dispersion, an organic solvent solution, a powder, which is coated on an organic material and thermally activated by heating; an insert molding method and; when the fluorine-containing adhesive material of the present invention is laminated with a thermoplastic polymer which can be melt shapable, a coextrusion method.

The laminate of the present invention can be shaped into various shapes such as a hose, a pipe, a tube, a sheet, a seal, a gasket, a packing, a film, a tank, a roller, a bottle and a container by these methods.

Further, the present invention relates to a process for manufacturing a shaped laminate article which comprises shaping a fluorine-containing adhesive material (A) having a carbonyl group-containing functional group and an organic material (B) by coextrusion at a shaping temperature, that is, at such a temperature that a resin temperature at shaping exceeds a crystal melting point or glass transition point of each material. That is, since adhesion between the materials (A) and (B) and shaping into the desired shape can be accomplished at the same time and continuously by melt coextrusion, the productivity is preferably excellent and the adhesion performance is preferably better.

It is preferable that in order to impart excellent interlayer adhesion strength, in the present process, the fluorine-containing adhesive material (A) and the organic material (B) are both selected from thermoplastic resins having a crystal melting point or a glass transition point of at most 270° C., preferably thermoplastic resins having a crystal melting point or a glass transition point of at most 230° C.

Further, from a viewpoint of interlayer adhesion strength between the materials (A) and (B) and the better appearance of a shaped article, a shaping temperature, that is, a resin temperature at shaping is at most 300° C., preferably at most 280° C.

When a shaping temperature (resin temperature) is too low, the fluorine-containing adhesive material (A) and the organic material (B) do not have sufficient fluidity, so that the sufficient adhesion between the materials (A) and (B) can not be accomplished and defective appearance such as surface roughening of a shaped article is caused.

In addition, when a shaping temperature is too high, insufficient adhesion between the materials (A) and (B) and peeling are undesirably caused, foaming and surface roughening not only on the surface of a shaped article but also at an interface between the materials (A) and (B), and worse appearance such as coloration are undesirably caused.

The present inventors now further discovered that a shaped article having the firm interlayer adhesion strength between the materials (A) and (B) and also the excellent appearance and quality can be prepared in the better productivity by shaping, by melt coextrusion, the fluorine-containing adhesive material (A) and the thermoplastic resin (B) having a crystal melting point of at most 230° C. at a shaping temperature which exceeds a crystal melting point of each material and is at most 280° C.

A second laminate of the present invention (hereinafter referred to as "laminate 2") is a laminate comprising:

(A-5) a layer comprising the fluorine-containing adhesive material (A), and (C-1) a layer comprising an inorganic material.

The thickness of the laminate 2 may be from 15 to 10,000 $\mu$m, preferably from 25 to 4,000 $\mu$m. The thickness of the fluorine-containing adhesive material layer (A-5) may be from 5 to 2,000 $\mu$m, preferably from 10 to 1,000 $\mu$m. The thickness of the inorganic material layer (C-1) may be from 10 to 9,000 $\mu$m, preferably from 15 to 3,000 $\mu$m.

Examples of the inorganic material layer (C-1) are a metal-based material and a known non-metal inorganic material.

The metal-based material includes a metal and an alloy of at least two metals, a metal oxide, a metal hydroxide, and a metal salt such as a carbonate and a sulfate. Inter alia, the metal, the metal oxide and the alloy are preferable in view of the adhesionability.

In the laminate of the present invention, examples of the metal-based material (C-1) are a metal such as aluminum, iron, nickel, titanium, molybdenum, magnesium, manganese, copper, silver, lead, tin, chromium, beryllium, tungsten and cobalt, and a metal compound, and an alloy of at least 2 of them. The metal-based material can be selected depending upon purpose and application.

Examples of the alloy are alloy steel such as carbon steel, Ni steel, Cr steel, Ni—Cr steel, Cr—Mo steel, stainless steel, silicon steel and permalloy, an aluminum alloy such as Al—Cl, Al—Mg, Al—Si, Al—Cu—Ni—Mg, and Al—Si—Cu—Ni—Mg, a copper alloy such as brass, bronze, silicon bronze, silicon brass, nickel silver, and nickel bronze, and a nickel alloy such as nickel manganese (D nickel), nickel-aluminum (Z nickel), nickel-silicon, Monel metal, constantan, nichrome Inconel, and Hastelloy.

In order to prevent the corrosion of metal, a surface of the metal may be coated with the other metal by electroplating, hot-dip plating, chromizing, siliconizing, calorizing, sherardizing and thermal spraying, a phosphate salt coating may be formed on surface of a metal by phosphate salt treatment, a metal oxide may be formed on the surface of a metal by anodizing or heat oxidation, and the surface of a metal may be treated by electrochemical corrosion prevention.

In order to further improve the adhesionability, the surface of a metal may be chemically treated with phosphate salt, sulfuric acid, chromic acid and oxalic acid, the surface of a metal may be treated by surface roughening treatment such as sandblast, shotblast, gritblast, honing, paperscratch, wirescratch and hairline treatment and, for the purpose of decorative design, the surface of a metal may be treated by coloration, printing and etching.

In addition, from a view that the better adhesionability can be expected and the excellent finction by lamination with a fluorine-containing polymer are sought, an aluminum-based metal material, an iron-based metal material and a copper-based metal material are preferable.

As the non-metal material, there are a glass material such as crystallized glass, foamed glass, heat ray reflecting glass, heat ray absorbing glass and multilayered glass, ceramic substrate such as tile, large-sized porcelain plate, ceramic panel and brick, natural stone such as granite and marble, a concrete substrate such as high strength concrete, glass fiber reinforced concrete (GRC), carbon fiber reinforced concrete (CFRC), air bubble expanded concrete (ALC) and composite ALC, a cement substrate such as extruded cement and composite shaped cement, and an asbestos slate, a porcelain enamel steel plate, single crystal silicon, polycrystalline silicon, amorphous silicon, clay, a boron-based material, and a carbon-based material. Among them, a glass material is preferable in that it is the better in the adhesionability and imparts the excellent function by lamination with the fluorine-containing polymer.

Preferable embodiments of a combination in the laminate 2 comprising the fluorine-containing adhesive material (A-5) of the present invention and the inorganic material (C-1) are set forth below:

i) a laminate comprising:
(A-5) a layer comprising a fluorine-containing adhesive material comprising the aforementioned copolymer (I), (II) or (III) and (C-1) a layer comprising an aluminum-based metal material.

In this case, as an aluminum-based metal material, pure aluminum, aluminum oxide, an aluminum alloy for casting or flattening such as Al—Cu, Al—Si, Al—Mg and Al—Cu—Ni—Mg and Al—Si—Cu—Ni—Mg-based alloy, high strength aluminum alloy, and corrosion-proof aluminum alloy can be used. The laminate (anodized aluminum) obtained by forming an oxidized film on the surface of the aforementioned aluminum or aluminum alloy by anodic oxidation using sodium hydroxide, oxalic acid, sulfuric acid or chromic acid in order to improve the corrosion protection, the surface hardness and adhesionability, or the aluminum-based metal material obtained by the aforementioned surface treatment can be used.

ii) a laminate comprising:
(A-5) a layer comprising a fluorine-containing adhesive material comprising the aforementioned copolymer (I), (II) or (III), and
(C-1) a layer comprising an iron-based metal material.

In this case, as the iron-based metal material, pure iron, iron oxide, carbon steel, Ni steel, Cr steel, Ni—Cr steel, Cr—Mo steel, Ni—Cr—Mo steel, stainless steel, silicon steel, permalloy, insensitive magnetic steel, magnet steel and cast iron steel can be used.

In the same manner as described above, a material having the surface lated with the other metal, for example, fused zinc-plated steel plate, alloyed used zinc-plated steel plate, aluminum-plated steel plate, zinc nickel-plated teel plate and zinc aluminum-plated steel plate, a material coated with the other metal by a penetration method or a thermal spraying method, a material with an oxidized film formed by chemical treatment with chromic acid or phosphoric acid or heat treating, and a material treated by electrical corrosion prevention (for example, galvanic steel plate) can be used.

The laminates i) and ii) are preferable in that they can impart resistance to corrosion, rust proofness, resistance to chemicals, weatherability, untackiness and tribological property to aluminum-based materials and iron-based materials, respectively, and can be used in construction materials, chemical plants, food processing, cooking machines, housing facility machines, appliance related parts, automobile related parts, and OA related parts.

iii) a laminate comprising:
   (A-5) a layer comprising a fluorine-containing adhesive material comprising the aforementioned copolymer (III), and
   (C-1) a layer comprising a copper-based metal material.

This laminate is preferable because it has low water absorption, imparts the excellent electrical properties of a fluororesin to a copper-based material, and can be used in electric or electronic related application such as printed boards and electric or electronic parts.

iv) a laminate comprising:
   (A-5) a layer comprising a fluorine-containing adhesive material comprising the aforementioned copolymer (I), (II) or (III) and
   (C-1) a layer comprising a glass-based material.

This laminate has transparency, imparts water repellency, oil repellency, reflection prevention, and low refractive index to the surface of a glass, and can be used in optical related parts, liquid crystal related parts, construction glasses, cooking machine-related parts and automobile glasses. In addition, the laminate plays a role on prevention of glass breakage and can be used in illumination related machines and non-combustible fire preventive safety glass, being preferable.

v) a laminate comprising:
   (A-5) a layer comprising a fluorine-containing adhesive material comprising the aforementioned copolymer (I), (II) or (III), and
   (C-1) a layer comprising a silicon-based material such as single crystal or polycrystalline silicon or amorphous silicon.

This laminate has transparency, imparts weatherability, resistance to stain and damage prevention to the surface, and can be used for a solar cell having the surface or back covered with a fluororesin, being preferable.

A fluorine-containing polymer (D-4) having no carbonyl group-containing functional group or, if any, having less than 150 carbonyl group-containing functional groups relative to $10^6$ main chain carbons can be laminated on the adhesive side of the laminate 2 comprising the fluorine-containing adhesive material (A-5) of the present invention and the inorganic material (C-1).

The thickness of the three-layered laminate may be from 25 to 10,000 $\mu$m, preferably from 40 to 4,000 $\mu$m. The thickness of the layer (A-5) of the fluorine-containing adhesive material may be from 5 to 2,000 $\mu$m, preferably from 10 to 1,000 $\mu$m. The thickness of the layer (D-4) of the fluorine-containing polymer having no carbonyl group-containing functional group or, if any, having less than 150 carbonyl group-containing functional groups relative to $10^6$ main chain carbons may be from 10 to 5,000 $\mu$m, preferably from 15 to 3,000 $\mu$m. The thickness of the layer (C-1) of the inorganic material may be from 10 to 5,000 $\mu$m, preferably from 15 to 3,000 $\mu$m.

That is, one laminate of the present invention is a laminate comprising:
   (A-6) a layer comprising the aforementioned fluorine-containing adhesive material,
   (D-4) a layer of a fluorine-containing polymer having no carbonyl group-containing functional group or, if any, having less than 150 carbonyl group-containing functional groups relative to $10^6$ main chain carbons, and
   (C-2) a layer comprising an inorganic material, wherein the layer (A-6) is positioned between the layer (D-4) and the layer (C-2), to form an adhesive layer. This laminate can effectively impart the excellent properties of the fluorine-containing polymer to an inorganic material.

In this case, it is preferable in view of the mutual adhesionability that the fluorine-containing adhesive polymer (A-6) used in an adhesive layer of the laminate 2 comprising these 3 layers has similar composition to that of the fluorine-containing polymer (D-4) and contains a carbonyl group-containing functional group.

In the laminate comprising the inorganic material (D-2) of the present invention, a suitable reinforcing agent, a filler, a stabilizer, an ultraviolet absorbing agent, a pigment and other additive may be contained in the fluorine-containing adhesive material (A-6) and the fluorine-containing polymer layer (D-4) as far as the adhesionability and other properties of the fluorine-containing polymer are not deteriorated. Such additives can improve thermal stability, surface hardness, resistance to abrasion, weatherability, electrification and other properties.

A process for manufacturing the laminate 2 of the present invention is appropriately selected depending upon a type and form of the fluorine-containing adhesive material, and a type and shape of the inorganic material.

For example, a method of preparing a fluorine-containing adhesive film using a fluorine-containing adhesive material, lapping with an inorganic material and laminating by thermal activation by heating as described above; a method of preparing a fluorine-containing adhesive material in the form of an aqueous or organic solvent dispersion, an organic solvent solution, and a powder, which is coated on the inorganic material and thermally activated by heating; and an insert shaping method can be adopted.

The laminate 2 of the present invention can be shaped into the shape such as a hose, a pipe, a tube, a sheet, a seal, a gasket, a packing, a film, a tank, a roller, a bottle and a container by these method.

PREFERRED EMBODIMENTS OF INVENTION

The present invention will be illustrated with referring to Reference Examples and Examples but is not limited to them.

In the following Reference Examples and Examples, the following measurements were carried out.
(1) Number of Carbonate Groups White powders of the resulting fluorine-containing polymer were compression molded at a room temperature to form a film having the thickness of from 1.5 to 2.0 mm. By infrared spectrometry of a film, an absorbance of the peak at 1809 cm$^{-1}$ ($v_{C=O}$) which is assigned to a carbonyl group of a carbonate group (—OC(=O)O—) was measured. The number (N) of carbonate groups per $10^6$ main chain carbons was calculated according to the following equation (1):

$$N = 500AW/\epsilon df \quad (1)$$

A: absorbance of $v_{C=O}$ peak in a carbonate group (—OC(=O)O—)

$\epsilon$: molar absorbance coefficient of $v_{C=O}$ in a carbonate group (—OC(=O)O—) [1·cm$^{-1}$·mol$^{-1}$] (here, $\epsilon$=170 is adopted, which is a molar absorbance coefficient of a model compound)

W: composition average molecular weight calculated from monomer composition d: density of a film [g/cm$^3$]

f: thickness of a film [mm]

Infrared absorption spectrometry was measured by scanning 40 times using Perkin-Elmer FTIR spectrometer 1 760X (manufactured by Perkin Elmer). The baseline of the resulting IR spectrum was automatically determined with Perkin-Elmer spectrum for Windows Ver. 1.4C and absorbance of a peak of 1809 cm$^{-1}$ was calculated. The thickness of a film was measured with a micrometer.

(2) Number of Carboxylic Fluoride Groups

By infrared spectrometry of a film obtained according to the same manner as in the above-mentioned (1), an absorbance of the peak at 1880 cm$^{-1}$ ($v_{C=O}$) which is assigned to a carbonyl group of a carboxylic fluoride group (—C(=O)F) was measured. The number of carboxylic fluoride groups was calculated using the equation (1) according to. the same manner as in the above-mentioned (1) except that $\epsilon$=600 was used as molar absorbance coefficient [1·cm$^{-1}$·mol$^{-1}$] of $v_{C=O}$ in carboxylic fluoride group, which is a molar absorbance coefficient of a model compound.

(3) Composition of Polymer

Measurement was carried out by $^{19}$F-NMR analysis.

(4) Melting Point ($T_m$)

Using Seiko type DSC apparatus, a melting peak when a temperature was raised at 10° C./min. was recorded and a temperature corresponding to a maximum of a melting peak was taken as a melting point ($T_m$).

(5) MFR (Melt Flow Rate)

Using a melt indexer (manufactured by Toyo Seiki K.K.), a weight (g) of a polymer which was flown per unit time (10 min.) through a nozzle having a diameter of 2 mm and a length of 8 mm at various temperatures and under a load of 5 kg was measured.

SYNTHESIS EXAMPLE 1

Synthesis of a Fluorine-containing Polymer Having a Carbonate Group

1 L of deoxidized water was charged into a glass-lined autoclave having an internal volume of 4 L. After vacuuming, 400 g of perfluorocyclobutane and 800 g of hexafluoropropylene were charged therein, and a temperature in the autoclave was maintained at 35° C. and a stirring rate was maintained at 580 rpm. After 2.0 g of perfluoro(1, 1,5-trihydro-1-pentene) represented by the formula (iii):

$$CH_2=CF(CF_2)_3H \quad (iii)$$

and 0.85 g of cyclohexane were charged therein, a mixture gas of tetrafluoroethylene/ethylene/perfluorocyclobutane (molar ratio=78.9:16.6:4.5) was injected therein at 12 kgf/cm$^2$G.

Then, 8.0 g of di-n-propylperoxydicarbonate was added to initiate polymerization. Since pressure was lowered as the polymerization proceeded, a mixture gas of tetrafluoroethylene/ethylene/perfluorocyclobutane (molar ratio=52.8:42.7:4.5) was additionally injected therein to maintain the pressure at 12 kgf/cm$^2$G. During the polymerization, 1.15 g of the compound represented by the formula (iii) was charged therein in 9 portion s with a micropump. The polymerization was performed for total 11 hours. After completion of polymerization, the content was recovered, and washed with water to give 137 g of powdery polymer. The physical properties of the resulting polymer are shown in Table 1.

SYNTHESIS EXAMPLE 2

Synthesis of a Fluorine-containing Polymer Having a Carbonate Group

400 L of pure water was charged to a 1,000 L stainless autoclave, the interior of the system was sufficiently substituted with a nitrogen gas. After vacuuming, 270 kg of perfluorocyclobutane was charged. Then, 330 g of cyclohexane and 950 g of perfluoro(1,1,5-trihydro-1-pentene) (compound of the formula (iii)) were injected therein using a nitrogen gas and a temperature of the interior of the system was maintained at 35° C.

A premixed mixture gas of tetrafluoroethylene/ethylene (96:4 mol %) was injected therein so that internal pressure reached 12 kgf/cm$^2$G while stirring. Then, 1.2 kg of a 50% methanol solution of di-n-propylperoxydicarbonate was injected therein using nitrogen to initiate a polymerization reaction. Since pressure was lowered as the polymerization reaction proceeded, a pre-mixed mixture gas of tetrafluoroethylene/ethylene (molar ratio 67:33 mol %) was additionally supplied therein to maintain the pressure of the system at 12 kgf/cm$^2$G. During 190 kg of a mixture gas of tetrafluoroethylene/ethylene was consumed with the polymerization reaction, 12 kg of perfluoro(,1,1,5-trihydro-1-pentene) was supplied continuously with a pump, and then the polymerization was completed.

After the completion of polymerization, the content was recovered, and washed with water and dried to give 192 kg of powdery polymer. The physical properties of the resulting polymer are shown in Table 1.

SYNTHESIS EXAMPLE 3

Synthesis of a Fluorine-containing Polymer Having a Carbonate Group

The same procedure as in Synthesis Example 1 was repeated except that amounts of perfluorocyclobutane and hexafluoropropylene to be charged first were 600 g and 600 g, respectively, an amount of cyclohexane to be charged was 1.6 g, and an amount of di-n-propylperoxydicarbonate was 10.0 g. The polymerization for 8 hours afforded 153 g of a powdery polymer. The physical properties of the resulting polymer are shown in Table 1.

SYNTHESIS EXAMPLE 4

Synthesis of a Fluorine-containing Polymer Having a Carbonate Group

The same procedure as in Synthesis Example 1 was repeated except that amounts of perfluorocyclobutane and hexafluoropropylene to be charged first were 700 g and 500 g, respectively, and an amount of cyclohexane to be charged was 1.5 g. The polymerization for 4.5 hours afforded 136 g of a powdery polymer. The physical properties of the resulting polymer are shown in Table 1.

SYNTHESIS EXAMPLE 5

Synthesis of a fluorine-containing Polymer Having no Carbonate Group 190 kg of a powdery polymer synthesized according to the same manner as in Synthesis Example 2 and 200 L of pure water were charged in a 500 L stainless tank, and 14 kg of 28% aqueous ammonia was added, which was heated at 80° C. for 5 hours with stirring. The content powders were removed, washed with water and dried to give 189 kg of a powdery polymer. The physical properties of the resulting polymer are shown in Table 1.

SYNTHESIS EXAMPLE 6

Synthesis of a Fluorine-containing Polymer Having a Carbonate Group

400 L of pure water was added to a 1000 L stainless autoclave, the interior of the system was sufficiently substituted with a nitrogen gas. After vacuuming, 270 kg of perfluorocyclobutane was charged. Then, 2.3 kg of perfluoro (1,1,5-trihydro-1-pentene)(compound of the formula (iii)) was injected therein using a nitrogen gas and a temperature of the interior of the system was maintained at 35° C. while stirring.

A premixed mixture gas of tetrafluoroethylene/ethylene (96:4 mol %) was injected therein while stirring so that internal pressure reached 12 kgf/cm²G. Then, 2.3 kg of a 50% methanol solution of di-n-propylperoxydicarbonate was injected therein using nitrogen to initiate a polymerization reaction. Since pressure was lowered as the polymerization reaction proceeded, a premixed mixture gas of tetrafluoroethylene/ethylene (molar ratio=67:33 mol %) was additionally supplied therein to maintain the pressure of the system at 12 kgf/cm²G. During 190 kg of a mixture gas of tetrafluoroethylene/ethylene was consumed with a polymerization reaction, 12 kg of perfluoro(1,1,5-trihydro-1-pentene) was supplied continuously with a pump, and the polymerization was completed.

After the completion of polymerization, the content was recovered, and washed with water and dried to give 198 kg of a powdery polymer. The physical properties of the resulting polymer are shown in Table 1.

SYNTHESIS EXAMPLE 7

Synthesis of a Fluorine-containing Polymer Having a Carboxylic Fluoride

Powders obtained in Synthesis Example 6 were charged in an single axial extruder (VS 50-24 manufactured by Tanabe Plastic Kikai K.K.)(L/D=24)(screw diameter: 50 mm), and extruded at a cylinder temperature of from 290 to 300° C. and a die temperature of 300° C. to give a pellet. The physical properties of the resulting polymer are shown in Table 1.

TABLE I

| | Composition of monomers (mol %) TFE/Et/HFP/compound of formula (iii) | Number of carbonate groups relative to $10^6$ main chain carbons | Number of carboxylic halide groups relative to $10^6$ main chain carbons | Melting point (° C.) | MFR (g/10 min.) (Measurement temperature) |
|---|---|---|---|---|---|
| Synthesis Example 1 | 46.2/35.8/17.5/0.5 | 356 | Not detected | 158.2 | 42 (230° C.) |
| Synthesis Example 2 | 66.9/31.0/0/2.1 | 255 | Not detected | 226.3 | 33.4 (297° C.) |
| Synthesis Example 3 | 48.8/37.8/13.0/0.4 | 157 | Not detected | 191.8 | 5.5 (265° C.) |
| Synthesis Example 4 | 49.8/40.4/9.4/0.4 | 121 | Not detected | 211.0 | 1.6 (265° C.) |
| Synthesis Example 5 | 66.9/31.0/0/2.1 | Not detected | Not detected | 226.3 | 33.4 (297° C.) |
| Synthesis Example 6 | 65.8/31.2/0/3.0 | 526 | Not detected | 214.8 | 51.6 (297° C.) |
| Synthesis Example 7 | 65.8/31.2/0/3.1 | 86 | 335 | 214.8 | — |

TFE: tetrafluoroethylene
Et: ethylene
HFP: hexafluoropropylene
Compound of formula (iii): $CH_2=CF(CF_2)_3H$

EXAMPLE 1

Adherability Between a Fluorine-containing Polymer Having a Carbonate Group and a Polyamide Powders obtained in Synthesis Example 1 were charged into a mold aving a diameter of 120 mm, which was mounted on a press machine set at 200° C., and melt pressed at a pressure of about 50 kgf/cm² to give a sheet having the thickness of 0.5 mm.

Separately, Polyamide-12 (manufactured by Ube Industries, Ltd., trade name: UBE 3035 MJ1) was pressed at 200° C. according to the same manner as described above to give a sheet having the thickness of 0.5 mm.

Then, the sheet of Synthesis Example 1 and the Polyamide-12 sheet were piled and a polyimide film was put partially between the two sheets as a spacer, which was welded by pressing at 230° C. at a pressure of 0.25 kgf/cm² for 50 seconds using an automatical welding machine (SK-D-FA48 manufactured by Shimakura Denshi Kogyo K.K.).

The polyimide film spacer was removed, and a maximum peeling strength (kgf/cm) was measured according to a T peeling testing method using Tensilon universal testing machine (manufactured by Orientic K.K.), while a non-contact parts of a fluorine-containing polymer and a polyamide were grasped.

EXAMPLE 2

Adherability Between a Fluorine-containing Polymer Having a Carbonate Group and a Polyamide Preparation of each sheet and a welded sample with Polyamide-12 and T peeling test were performed according to the same manner as in Example 1 except that polymer powders obtained in Synthesis Example 2 were used in place of polymer powders obtained in Synthesis Example 1, a sheet was obtained by melt-press-molding at 250° C., and the welding was performed at 250° C. using an automatical welding machine. The results are shown in Table 2.

EXAMPLE 3

Adherability Between a Fluorine-containing Polymer Having a Carbonate Group and a Polyamide Preparation of each sheet and a welded sample with Polyamide-12 and T peeling test were performed according to the same manner as in Example 1 except that polymerizable powders obtained in Synthesis Example 3 were used in place of polymer powders obtained in Synthesis Example 1, a sheet which had been melt-press-molded at 230° C. was used. The results are shown in Table 2.

EXAMPLE 4

Adherability Between a Fluorine-containing Polymer Having an Acid Fluoride Group and a Polyamide Preparation of each sheet and a welded sample with Polyamide-12 and T peeling test were performed according to the same manner as in Example 1 except that polymer pellets obtained in Synthesis Example 7 were used in place of polymer powders obtained in Synthesis Example 1, a sheet which had been press-molded at 230° C. was used. The results are shown in Table 2.

COMPARATIVE EXAMPLE 1 AND 2

Preparation of each sheet and a welded sample with Polyamide, and T peeling test were performed according to the same manner as in Example 2 except that polymer powders obtained in Synthesis Example 4 (Comparative Example 1) and Synthesis Example 5 (Comparative Example 2) respectively were used in place of polymer powders obtained in Synthesis Example 2. The results are shown in Table 2.

TABLE 2

| | Fluorine-containing polymer | Number of total of carbonate groups and acid fluoride groups (per $10^6$ main chain carbons) | Adherability to Polyamide-12 (Maximum peeling strength, kgf/cm) |
|---|---|---|---|
| Example 1 | Synthesis Example 1 | 356 | 4.1 |
| Example 2 | Synthesis Example 2 | 255 | 3.8 |
| Example 3 | Synthesis Example 3 | 157 | 3.2 |
| Example 4 | Synthesis Example 7 | 416 | 4.0 |
| Comparative Example 1 | Synthesis Example 5 | 121 | 0.1 |
| Comparative Example 2 | Synthesis Example 6 | Not detected | Not detected |

EXAMPLES 5 to 7, AND COMPARATIVE EXAMPLES 3 AND 4

Adherability to Glass

Regarding each of polymer powders obtained in Synthesis Example 1 (Example 5), Synthesis Example 2 (Example 6), Synthesis Example 3 (Example 7), Synthesis Example 4 (Comparative Example 3), Synthesis Example 5 (Comparative Example 4), the melt press molding was conducted according to the corresponding procedures as in Examples 1 to 3 and Comparative Examples 1 and 2 as described above, to give a shaped sheet having a thickness of 0.4 mm.

A shaped sheet was held between upper and lower Pyrex (trademark) glass plates (width of 20 mm, length of 30 mm, thickness of 5 mm) in which an end part was overlaid at a length of 12 mm, the other end of the upper glass plate was overlaid on the other lower glass plate using as FEP film having a thickness of 0.4 mm as a spacer, the whole was charged between two stainless steel (SUS) plates. A load was positioned thereon so that a total weight became 0.18 kg/cm² including a weight of a stainless steel plate, which was allowed to stand in an electric furnace at 230° C. (250° C. in Example 5 and Comparative Example 4) for 30 minutes to give test pieces.

Adhesion strength between glass plates which had been adhered with a polymer was measured by a tensile shearing method. A test jig which had been adapted to the external shape of two glass plates adhered with a polymer was set on Tensilon universal testing machine manufactured by Orientic K.K., and a tensile shearing test was performed at a cross head speed of 20 mm/min. Maximum adhesion strength was measured. The results are shown in Table 3.

TABLE 3

| | Fluorine-containing polymer | Number of carbonate groups (per $10^6$ main chain carbons) | Adherability to glass (Tensile breaking adhesion strength, kgf/cm²) |
|---|---|---|---|
| Example 5 | Synthesis Example 1 | 256 | 138 (Glass breakage) |
| Example 6 | Synthesis Example 2 | 255 | 125 (Glass breakage) |
| Example 7 | Synthesis Example 3 | 157 | 102 (Glass breakage) |

TABLE 3-continued

|  | Fluorine-containing polymer | Number of carbonate groups (per $10^6$ main chain carbons) | Adherability to glass (Tensile breaking adhesion strength, kgf/cm$^2$) |
|---|---|---|---|
| Comparative Example 3 | Synthesis Example 4 | 121 | 9 (Interface peeling) |
| Comparative Example 4 | Synthesis Example 5 | Not detected | Not adhered |

REFERENCE EXAMPLE 1

Preparation of a Pellet of a Fluorine-containing Polymer Having a Carbonate Group Polymer powders obtained in Synthesis Example 2 were charged into a single axial extruder (VS 50-24 manufactured by Tanabe Plastic Kikai K.K.) (L/D=24)(screw diameter: 50 mm), and extruded at a cylinder temperature of from 230 to 240° C., a die temperature of 240° C. and a resin temperature near a die of 258° C. to give a pellet.

By IR spectrometry of the obtained pellet, the number of carbonate groups was found to be 252 per $10^6$ main chain carbons.

REFERENCE EXAMPLE 2

A pellet was obtained according to the same manner as in Reference Example 1 except that the fluorine-containing polymer powders having no carbonate group obtained in Synthesis Example 5 were used in place of the polymer powders obtained in Synthesis Example 2.

EXAMPLE 8

Preparation of a Multilayered Tube

A multilayered tube (two layers) having an external diameter of about 8 mm and an internal diameter of about 6 mm in which Polyamide-12 (the same as that in Example 1) was disposed in an outer layer and a fluorine-containing polymer obtained in Reference Example 1 (Synthesis Example 2) was disposed in an inner layer by using pellets of Polyamide-12 and pellets of the fluorine-containing polymer obtained in Reference Example 1 was shaped by coextrusion of two types and two layers equipped with a multimanifold die under the conditions shown in Table 4. The adherability and the appearance of the surface of an inner layer of the multilayered tube were measured.

TABLE 4

|  | Example 8 | Example 9 | Comparative Example 5 | Comparative Example 6 |
|---|---|---|---|---|
| Resin of an inner layer | Reference Example 1 | Synthesis Example 7 | Reference Example 2 | Reference Example 1 |
| Resin of an outer layer | Polyamide-12 | | | |
| Inner layer | | | | |
| Cylinder temperature (° C.) | 260–261 | 260–261 | 260–261 | 285–295 |
| Resin temperature (° C.) | 274 | 274 | 275 | 315 |

TABLE 4-continued

|  | Example 8 | Example 9 | Comparative Example 5 | Comparative Example 6 |
|---|---|---|---|---|
| Outer layer | | | | |
| Cylinder temperature (° C.) | 210–235 | 210–235 | 210–235 | 210–235 |
| Resin temperature (° C.) | 243 | 243 | 243 | 245 |
| Outer layer die temperature (° C.) | 260 | 260 | 260 | 260 |
| Tube take-up speed (m/min.) | 9.5 | 9.5 | 9.5 | 9.5 |

(6) Adherability

A test piece having a width of 5 mm was cut from a tube, and a 180 degree peeling test was carried out at 50 mm/min. using Tensilon universal testing machine to measure a maximum adhesion strength.

(7) Surface Appearance of an Inner Layer

The surface of an inner layer of the resulting multilayered tube was visually observed and the smooth inner wall surface was expressed as "○".

The results are shown in Table 5.

EXAMPLE 9

Preparation of a tube and a test were carried out under the conditions shown in Table 4 according to the same manner as in Example 8 except that a multilayered tube was shaped using pellets of the fluorine-containing polymer obtained in Synthesis Example 7 in place of pellets of the fluorine-containing polymer obtained in Reference Example 1. The test results are shown in Table 5.

COMPARATIVE EXAMPLE 5

Preparation of a tube and a test were carried out under the conditions shown in Table 4 according to the same manner as in Example 7 except that a multilayered tube was shaped using pellets obtained in Reference Example 2 (Synthesis Example 5) in place of pellets of the fluorine-containing polymer obtained in Reference Example 1. The test results are shown in Table 5.

COMPARATIVE EXAMPLE 6

Preparation of a tube and a test were carried out according to the same manner as in Example 7 except that the molding conditions were changed (a resin temperature, a cylinder temperature and the like) as shown in Table 4. The test results are shown in Table 5.

TABLE 5

|  | Example 8 | Example 9 | Comparative Example 5 | Comparative Example 6 |
|---|---|---|---|---|
| Resin of an inner layer | Reference Example 1 | Synthesis Example 7 | Reference Example 2 | Reference Example 1 |
| Resin of an outer layer | Polyamide-12 | | | |
| Shape of a tube | | | | |
| External diameter (mm) | 7.9 | 8.0 | 8.0 | 8.0 |

TABLE 5-continued

|  | Example 8 | Example 9 | Comparative Example 5 | Comparative Example 6 |
|---|---|---|---|---|
| Thickness of an inner layer (mm) | 0.19 | 0.30 | 0.18 | 0.21 |
| Thickness of an outer layer (mm) | 0.76 | 0.14 | 0.77 | 0.79 |
| Adhesion strength (N/cm) | 16.4 | 10.4 | 5.2 | 7.0 |
| Appearance of the surface of an inner layer | ○ | ○ | ○ | X (Foaming, partial peeling) |

EXAMPLE 10

Adherability to Ethylene-vinyl Alcohol Copolymer

After preparation of a sheet of a fluorine-containing polymer having a carbonate group (Synthesis Example 1) and preparation of an EVOH sheet were performed according to the same manner as in Example 1 except that ethylene vinyl alcohol copolymer (EVOH)(Eval F101 manufactured by Kuraray Co., Ltd., ethylene unit content: 32 mol %) was used in place of Polyamide-12, the sheet of the polymer of Synthesis Example 1 and the sheet of EVOH were lapped and welded at 230° C. using an automatical welding machine as in Example 1.

A maximum peeling strength was measured according to a T peeling test method as in Example I and found to be 3.8 kgf/cm.

SYNTHESIS EXAMPLE 8

Synthesis of a Fluorine-containing Polymer Having a Carbonate Group

1 L of deoxidized water was charged into a glass-lined autoclave having an internal volume of 4 L. After vacuuming, 2.2 kg of perfluorocyclobutane, 350 g of perfluoro(methyl vinyl ether)(PMVE) and 155 g of tetrafluoroethylene (TFE) were charged therein, and a autoclave temperature was maintained at 35° C. and a stirring rate was maintained at 600 rpm. Then, 2.7 g of di-n-propylperoxydicarbonate was added thereto to initiate the polymerization. Since pressure was lowered as the polymerization proceeded, a mixture gas of tetrafluoroethylene/perfluoro(methyl vinyl ether)(molar ratio=88:12) was additionally injected therein to maintain the pressure at 6.3 kgf/cm²G for about 7 hours. After the completion of polymerization, the contents were recovered, washed with water and dried to give 106 g of white powdery polymer.

The physical properties of the resulting polymer were as follows:

Composition: TFE/PMVE=87.3/12.7 mol %

Melting point: 221° C.

Number of carbonate group: 2,100 (relative to $10^6$ carbon atoms)

Number of carboxylic halide groups: Not detected

EXAMPLE 11

Adherability to Polyamide

Preparation of each sheet by melt-press-molding, preparation of a welded sample with Polyamide-12 by an automatical welding machine, and a T peeling test were carried out according to the same manner as in Example 2 except that polymer powders obtained in Synthesis Example 8 were used in place of polymer powders obtained in Synthesis Example 2.

Maximum peeling strength was 4.5 kgf/cm.

EXAMPLE 12

Adherability to Ethylene/Vinylalcohol Copolymer

Preparation of each sheet, preparation of a welded sample with EVOH and a T peeling test were carried out according to the same manner as in Example 10 except that a polymer sheet of Synthesis Example 8 which had been melt-press-molded at 250° C. was used in place of the polymer sheet of Synthesis Example 1 and the welding was performed at 250° C. using an automatical welding machine.

A maximum peeling strength was 4.1 kgf/cm.

What is claimed is:

1. A laminate comprising:
   (A) a layer comprising a fluorine-containing adhesive material, wherein said fluorine-containing adhesive-material comprises a fluorine-containing ethylenic polymer having at least one carbonyl group-containing functional group selected from the group consisting of a carbonate group and a carboxylic halide group at a chain end or a side chain of the polymer, wherein the number of the carbonyl group-containing functional groups is at least 150 relative to $1 \times 10^6$ main chain carbons, and
   (B) a layer comprising an organic material having a site exhibiting the affinity or reactivity with the layer (A).

2. The laminate according to claim 1, wherein the number of carbonate groups and/or carboxylic halide groups is at least 250 relative to $1 \times 10^6$ main chain carbons.

3. The laminate according to claim 1, wherein the number of carbonate groups and/or carboxylic halide groups is at least 300 relative to $1 \times 10^6$ main chain carbons.

4. The laminate according to claim 1, wherein the carbonate group and/or a carboxylic halide group is at the polymer chain end of said fluorine-containing ethylenic polymer of the fluorine-containing adhesive material of the layer (A).

5. The laminate according to claim 1, wherein the crystal melting point or glass transition point of the fluorine-containing ethylenic polymer is not more than 270° C.

6. The laminate according to claim 5, wherein the crystal melting point or glass transition point of the fluorine-containing ethylenic polymer is not more than 230° C.

7. The laminate according to claim 5, wherein the crystal melting point or glass transition point of the fluorine-containing ethylenic polymer is not more than 200° C.

8. The laminate according to claim 5, wherein the fluorine-containing ethylenic polymer is selected from the group consisting of:
   a copolymer comprising tetrafluoroethylene and ethylene,
   a polymer comprising vinylidene fluoride, and
   a copolymer comprising tetrafluoroethylene and a monomer represented by the formula (i):

$$CF_2=CF-Rf^1 \qquad (i)$$

wherein $Rf^1$ is $Cf_3$ or $ORf^2$, wherein $Rf^2$ is a perfluoroalkyl group having 1 to 5 carbon atoms.

9. The laminate according to claim 8, wherein the fluorine-containing ethylenic polymer having the carbonate group and/or carboxylic halide group is a copolymer comprising:

40 to 80 mol % of tetrafluoroethylene, 20 to 60 mol % of ethylene, and 0 to 40 mol % of an ethylenic monomer copolymerizable with said tetrafluoroethylene and ethylene.

10. The laminate according to claim 9, wherein the ethylenic monomer copolymerizable with tetrafluoroethylene and ethylene is at least one ethylenic monomer selected from the group consisting of hexafluoropropylene, chlorotrifluoroethylene, a monomer represented by the formula (ii):

$$CH_2=CX^1(CF_2)_nX^2 \qquad (ii)$$

wherein $X^1$ is H or F, $X^2$ is H, F or Cl, and n is an integer of from 1 to 10, a perfluoro(alkyl vinyl ether), and propylene.

11. The laminate according to claim 6, wherein the fluorine-containing ethylenic polymer having the carbonate group and/or carboxylic halide group is a copolymer comprising 10 to 100 mol % of vinylidene fluoride, 0 to 80 mol % of tetrafluoroethylene and 0 to 30 mol % of at least one ethylenic monomer selected from the group consisting of hexafluoropropylene and chlorotrifluoroethylene.

12. The laminate according to claim 1, wherein the layer (B) comprises an organic material having a functional group exhibiting the affinity or reactivity with the carbonate group and/or carboxylic halide group.

13. The laminate according to claim 12, wherein the layer (B) comprises a polymer material having at least one functional group selected from a hydroxyl group, a carboxyl group, a carboxylic salt group, an ester group, a carbonate group, an amino group, an amido group, an imido group, a mercapto group, a thiolate group, a sulfonic acid group, a sulfonate salt group, a sulfonate ester group and an epoxy group in a molecular chain.

14. The laminate according to claim 1, wherein the layer (B) comprises a thermoplastic resin having a crystal melting point or a glass transition point of at most 270° C.

15. The laminate according to claim 1, wherein the layer (B) comprises a polymer material selected from polyamides, polyesters, polycarbonates, polyvinyl chlorides, polyacrylates, polyvinyl acetates, polyolefins, polyvinyl alcohols and ethylene/vinyl alcohol copolymers.

16. A mutilayered tube or multilayered hose, a multilayered film or a multilayered sheet, a tank, or a bottle obtained by shaping the laminate according to claim 1.

17. The multilayered tube or multilayered hose according to claim 16, the tube or hose is a multilayered tube for fuel piping or a multilayered hose for fuel piping obtained by shaping a laminate comprising:

(A) a layer comprising a fluorine-containing adhesive material comprising a fluorine-containing ethylenic polymer having at least one-carbonyl group-containing functional group selected from the group consisting of a carbonate group and a carboxylic halide group at a polymer chain end or a side chain, wherein the number of the carbonyl group-containing functional groups is at least 150 relative to $1 \times 10^6$ main chain carbons, and (B) a layer comprising a polyamide which is an organic material having a site exhibiting the affinity or reactivity with the layer (A).

18. A laminate having at least three layers, which comprises (D) a layer comprising fluorine-containing ethylenic polymer having no carbonate group and/or carboxylic halide group or having less than 150 carbonate groups and/or carboxylic halide groups relative to $1 \times 10^6$ main chain carbons of the fluorine-containing ethylenic polymer, the layer (D) being positioned on a side of (A) the fluorine-containing adhesive material of the laminate of claim 1.

* * * * *